United States Patent
Dargis (10) Patent No.: US 9,699,143 B2
(45) Date of Patent: *Jul. 4, 2017

(54) METHOD AND APPARATUS FOR PROVIDING SECURITY IN AN INTRANET NETWORK

(71) Applicant: AT&T Intellectual Property I, L.P., Atlanta, GA (US)

(72) Inventor: Anthony Dargis, Flemington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/727,457

(22) Filed: Jun. 1, 2015

(65) Prior Publication Data

US 2015/0264013 A1     Sep. 17, 2015

Related U.S. Application Data

(63) Continuation of application No. 14/271,167, filed on May 6, 2014, now Pat. No. 9,049,172, which is a continuation of application No. 12/187,639, filed on Aug. 7, 2008, now Pat. No. 8,739,269.

(51) Int. Cl.
*H04L 29/06* (2006.01)

(52) U.S. Cl.
CPC ......... *H04L 63/0272* (2013.01); *H04L 63/08* (2013.01); *H04L 63/101* (2013.01); *H04L 63/1458* (2013.01); *H04L 63/164* (2013.01); *H04L 63/20* (2013.01)

(58) Field of Classification Search
CPC . H04L 63/0272; H04L 12/4641; H04L 63/08; H04L 63/164; H04L 63/20
See application file for complete search history.

(56) References Cited

U.S. PATENT DOCUMENTS

| | | | |
|---|---|---|---|
| 6,282,193 B1 | 8/2001 | Hluchyj et al. | |
| 6,751,728 B1 | 6/2004 | Gunter et al. | |
| 7,212,811 B2 | 5/2007 | Dowling et | |
| 7,647,643 B2 | 1/2010 | Lauer et al. | |
| 8,739,269 B2 | 5/2014 | Dargis | |
| 2005/0268331 A1 | 12/2005 | Le et al. | |
| 2006/0075084 A1* | 4/2006 | Lyon | H04L 29/06027 709/223 |
| 2006/0089125 A1 | 4/2006 | Frank | |
| 2006/0225133 A1 | 10/2006 | Balasubramaniyan | |
| 2006/0239203 A1 | 10/2006 | Talpade et al. | |
| 2006/0282891 A1 | 12/2006 | Pasko | |
| 2007/0094712 A1* | 4/2007 | Gibbs | H04L 41/0893 726/3 |
| 2007/0110062 A1* | 5/2007 | Balay | H04L 12/18 370/390 |

(Continued)

*Primary Examiner* — Mohammad A Siddiqi (57) ABSTRACT

A method and an apparatus for providing security in an intranet network are disclosed. For example, the method receives a packet at a customer edge router, and applies an inbound access control list by the customer edge router to the packet if the packet is destined to a server in a protected server group, wherein said protected server group identifies one or more servers within the intranet network to be protected. The method applies an outbound access control list by the customer edge router to the packet if the packet is from a server in the protected server group.

20 Claims, 4 Drawing Sheets

(56) References Cited

U.S. PATENT DOCUMENTS

2007/0192847 A1     8/2007   Yeom
2007/0271362 A1*   11/2007   Bamnolker ......... H04L 63/0263
                                                                                                   709/223
2008/0271146 A1    10/2008   Rooney et al.

* cited by examiner

METHOD AND APPARATUS FOR PROVIDING SECURITY IN AN INTRANET NETWORK

This application is a continuation of U.S. patent application Ser. No. 14/271,167, filed May 6, 2014, now U.S. Pat. No. 9,049,172, which is a continuation of U.S. patent application Ser. No. 12/187,639, filed Aug. 7, 2008, now U.S. Pat. No. 8,739,269, all of which are herein incorporated by reference in their entirety.

The present invention relates generally to communication networks and, more particularly, to a method and apparatus for providing security in an intranet network, e.g., a Virtual Private Network (VPN).

BACKGROUND OF THE INVENTION

A customer may create an Intranet by interconnecting its Local Area Networks (LANs) over a service provider's network. For example, a customer may have multiple local area networks located in multiple geographical areas. The customer may then wish to enable users in various locations to communicate seamlessly. The customer may then subscribe to a Virtual Private Network (VPN) service from its service provider for interconnecting the multiple locations. The customer may then build an intranet network over the service provider's Internet Protocol (IP) network.

The customer may implement security at gateways to public networks to protect the VPN from malicious activities originating outside of the customer's Intranet network. For example, the customer may implement security at Customer Edge Routers (CERs) to prevent attacks originating in the IP network from reaching its various LANs. However, a malicious activity may originate within the Intranet network. For example, disgruntled employees, compromised users, etc. may attack servers or may access unauthorized information. In another example, a customer endpoint device such as a mobile device, may be traversing both the Intranet and Internet and may unintentionally create an easy access for a malicious code.

SUMMARY OF THE INVENTION

In one embodiment, the present invention discloses a method and apparatus for providing security in an intranet network, e.g., a Virtual Private Network (VPN). For example, the method receives a packet at a customer edge router, and applies an inbound access control list by the customer edge router to the packet if the packet is destined to a server in a protected server group, wherein said protected server group identifies one or more servers within the intranet network to be protected. The method applies an outbound access control list by the customer edge router to the packet if the packet is from a server in the protected server group.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing security in an intranet network. Although the present invention is discussed below in the context of VPN and IP networks, the present invention is not so limited. Namely, the present invention can be applied for other packet networks.

Figure 1:
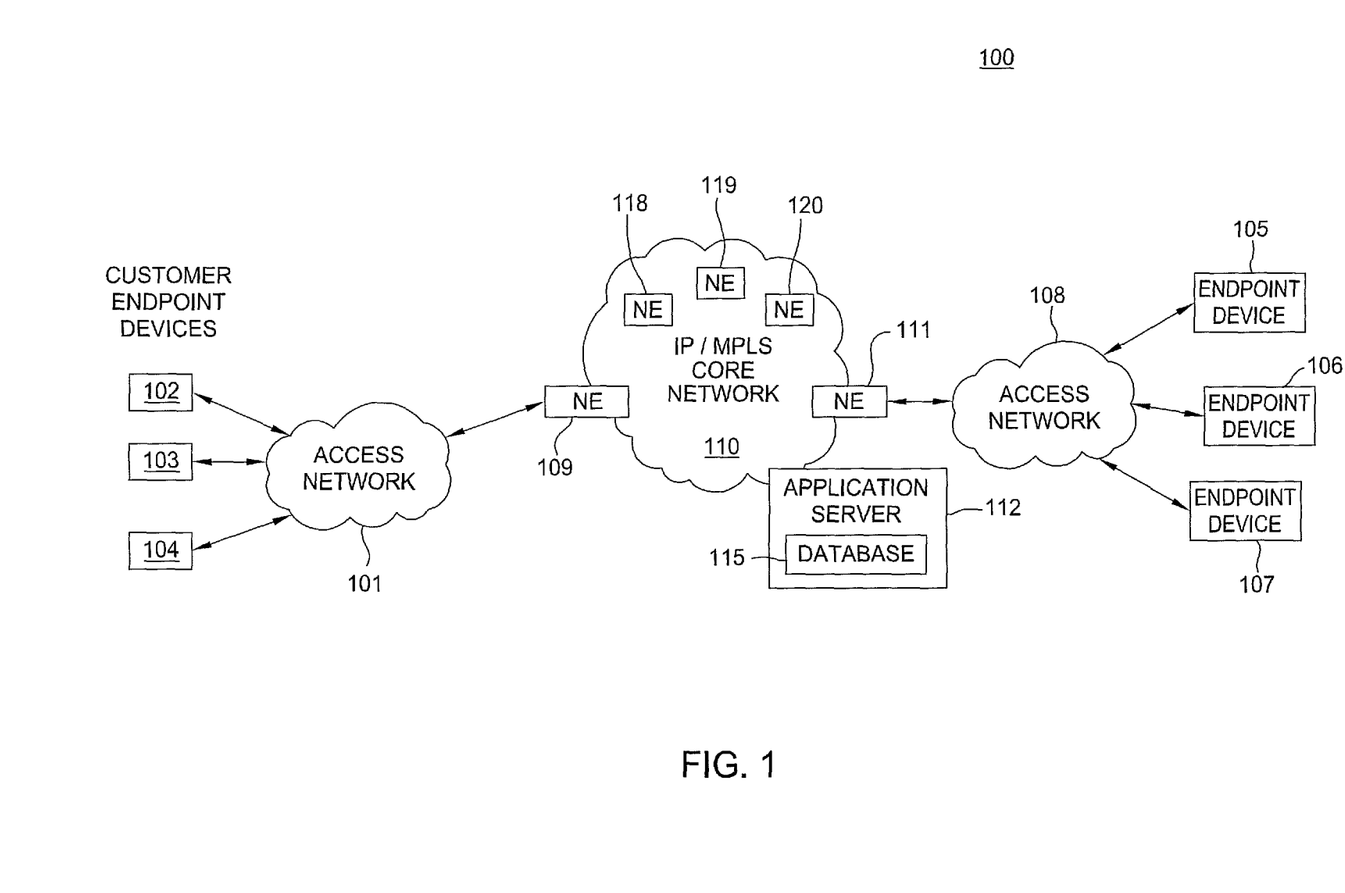
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. A customer may build an intranet network by interconnecting its LANs over the service provider's IP/MPLS network. The customer may implement security at gateways to public networks to protect the VPN from malicious activities originating outside of the customer's Intranet network. However, a malicious activity may originate within the Intranet network. For example, a user may utilize a customer endpoint device to traverse the Intranet and Internet simultaneously. The customer endpoint device may then unintentionally propagate viruses or worms to servers. Since the server has more trust for endpoint devices located within the Intranet, the malicious activity may be propagated to other servers and endpoint devices within the enterprise.

In one embodiment, the current invention provides a method for providing security in an intranet network. To better understand the current invention, the following terminology will first be provided:

An Intranet; and

Access control filter.

An intranet is a private network or a virtual private network that contains two or more interconnected local area networks. The interconnection may be over an IP/MPLS network. In one embodiment, an intranet includes connections through one or more gateway computers to the outside Internet. The main purpose of an intranet is to enable sharing of information and computing resources among users within an enterprise. An intranet may use tunneling to enable users to exchange private messages through the public network. For example, a company may implement encryption/decryption and security measures such as firewalls to connect one part of the intranet to another, over a public network.

Access control filter list refers to a filter used to ensure that information is available only from a permitted list of IP addresses. Access control filter list may also be referred to as an Access Control List (ACL). The filtering of packets may be based on source IP addresses, destination IP addresses, masks and/or routing protocols. The access control lists are configured on router interfaces, e.g., interfaces on CE routers connected to PE routers, interfaces on PE routers connected to CE routers, and so on. The content of an access control list may be established based on network security policies established for a network and routing policy for each interface. For example, a network security policy may provide entries for the ACL to either provide a list of addresses and/or protocols such that packets from those addresses and/or protocols are allowed into a network, or a list of addresses and/or protocols for blocking packets, e.g., based on their source and/or destination IP addresses, routing protocols, etc.

The current invention provides a method for providing security in an intranet network. In one embodiment, the method first identifies a group of servers to be protected. For example, a CER may be servicing 100 customer endpoint devices at a location. A portion of the 100 customer endpoint devices, e.g., 10 servers, may be identified to be protected. The servers identified to be protected may be referred to as a Protected Server Group (PSG). Access control lists may then be applied in a Customer Edge Router (CER) to monitor inbound and outbound sessions. For example, an inbound access control list may be used to control traffic from the outside network to the PSG. Similarly, an outbound access control list may be used to block traffic from PSG addresses from reaching other networks. For example, a server within the PSG that initiates an unsolicited session will be blocked. In other words, in one embodiment, if the server initiates a session without first receiving a request from a client will be viewed suspiciously since servers within the PSG should not be initiating sessions without first being asked to service a request.

For example, if a server in the PSG is compromised, the outbound access control list will automatically prevent the compromised server from accessing the outside network, e.g., the Internet and the customer LANs in other locations. Note that since the ACL is applied at the CER, servers within the PSG can be prevented from accessing other servers and customer endpoint devices if traffic from the compromised server passes the CER.

Figure 2:
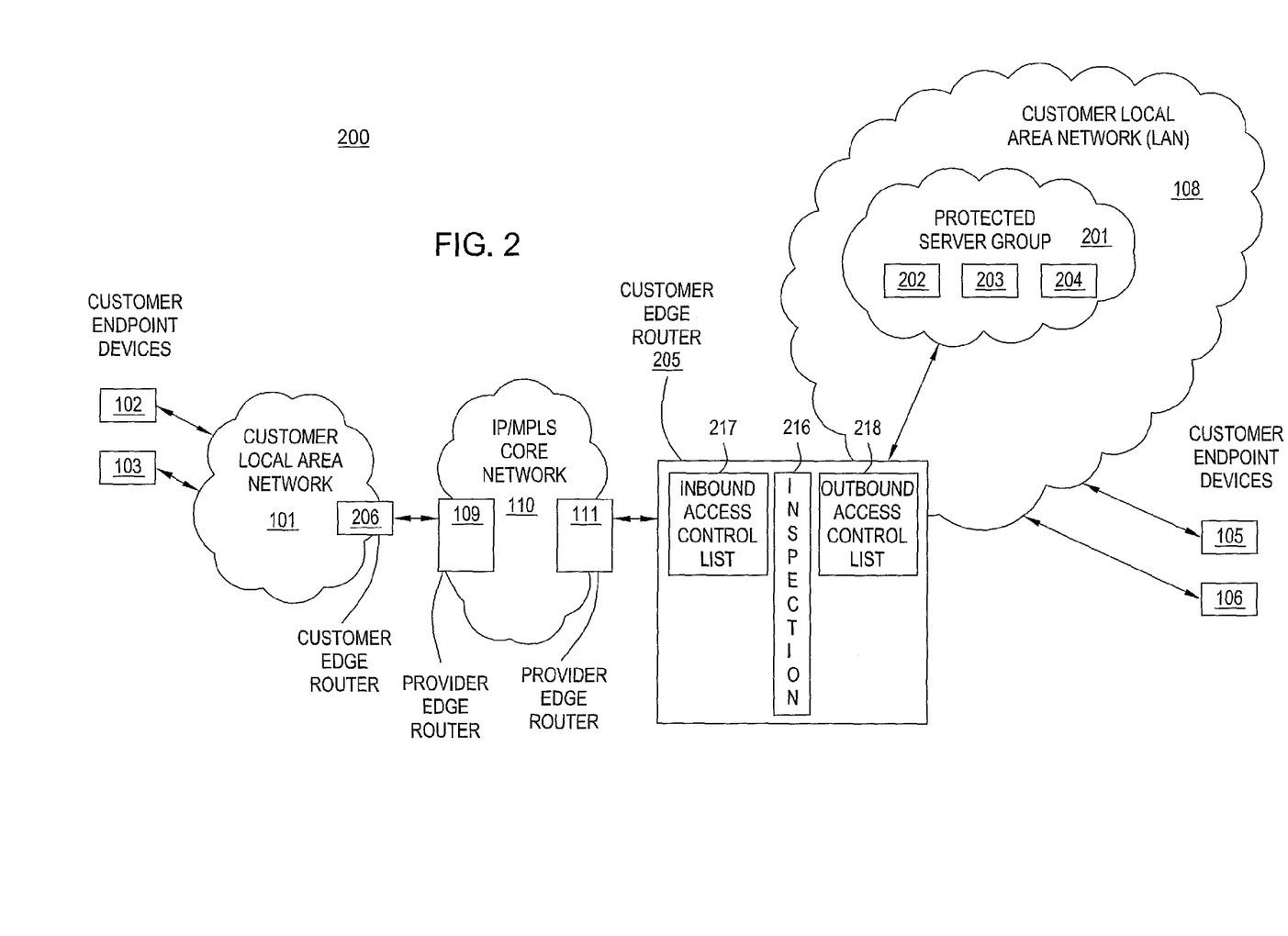
FIG. 2 illustrates an exemplary network with the current invention for providing security in an intranet network.

FIG. 2 illustrates an illustrative network 200 of the current invention for providing security in an intranet network. A customer with LANs 101 and 108 builds an intranet by interconnecting customer LANs 101 and 108 over a service provider's IP/MPLS core network 110. The LANs 101 and 108 contain Customer Edge Routers (CERs) 206 and 205, respectively. The IP/MPLS core network 110 contains the Provider Edge Routers (PERs) 109 and 111. CER 206 is a Border Gateway Protocol (BGP) routing peer to PER 109. CER 205 is a BGP routing peer to PER 111. Customer endpoint devices 102 and 103 access services from IP/MPLS core network 110 via LAN 101, CER 206 and PER 109. Similarly, customer endpoint devices 105 and 106 access services from IP/MPLS core network 110 via LAN 108, CER 205 and PER 111.

In one embodiment, the CER 205 also contains an inspection module 216, an inbound access control list 217 and an outbound access control list 218. The customer may wish to provide intranet security for servers 202, 203 and 204 located in LAN 108. The current method then creates a protected server group 201 that includes servers 202, 203 and 204.

The inspection module 216 is used to inspect packets for sessions to and from various destinations serviced by LAN 108. In one embodiment, the inspection module is able to examine the packet to determine TCP, UDP, and ICMP session to determine if any of the access control lists need to be modified to allow return traffic. The inbound access control list 217 is used to control traffic received via PER 111 to destinations in the protected server group 201.

The outbound access control list 218 is used to control traffic from the protected server group 201 from reaching to PER 111. That is, in one embodiment, the outbound access control list 218 is used to prevent "unsolicited" traffic originating from one of the servers in the PSG 201 from reaching the core network 110 and/or LAN 101. In other words, if a compromised server in the PSG initiates a session without first being asked to service a request, then the outbound access control list 218 will block the traffic from the compromised server. However, if the inspection module has detected an earlier request, then the inspection module will adjust the outbound access control list such that the server in the PSG is allow to respond accordingly, i.e., allowing return traffic from the server in the PSG to pass through.

In one embodiment, the current method creates a bypass entry in the outbound access control list to permit return traffic for stateless sessions invoked from an IP address outside of the PSG. The bypass entry is valid for a predetermined period of time, e.g., 30 seconds. It should be noted that the present invention is not limited to any particular type of sessions. Note that a Transmission Control Protocol (TCP) session may be inspected to ensure it is proceeding correctly. Packets for a TCP session that is not proceeding as expected are dropped. However, unlike TCP sessions, User Datagram Protocol (UDP) and Internet Control Message Protocol (ICMP) sessions are stateless. For example, UDP is a protocol for exchanging a datagram without an acknowledgement or guaranteed delivery. ICMP is a network layer IP protocol for reporting errors and other information needed for packet processing. Sessions for UDP and ICMP may then be approximated by allowing return traffic for a predetermined period of time.

For example, the method inspects UDP sessions invoked from an IP address outside of the PSG. If the UDP session is permitted, the method then creates a bypass entry in the outbound access control list to prevent the return traffic from the PSG from being blocked. The bypass entry enables the response for a stateless session, e.g., UDP session, to be processed by the CER. For example, a UDP session may be invoked by customer endpoint device 102 directed towards server 202. The UDP session is inspected by the inspection module 216. If the session is permitted, the method then creates a bypass entry in the outbound access control list 218. The bypass entry enables the response from server 202 to proceed towards the customer endpoint device 102.

In one embodiment, the duration of time for a validity of a bypass entry is configurable by a service provider or a customer. For example, the bypass entry may be valid for 30 seconds, 1 minute, etc. as configured by either the service provider or the customer.

In one embodiment, the current method allows a packet for a ping and/or trace-route message to proceed towards one or more servers in the PSG. For example, a network monitoring device located at another customer site (LAN) or in the service provider's network may perform trouble isolation by pinging devices in the PSG. The packet(s) for a ping may use ICMP sessions.

In one embodiment, the method determines when a server has been compromised by monitoring server requests for creating an unsolicited session. For example, servers within a PSG may create session only to a small known set of IP addresses, e.g., based upon received requested from this set of IP addresses. If a server in the PSG attempts to create a session to another address on its own accord without first been solicited to service a request, the attempt to create a session on its own accord may be a strong indicator of that server may be compromised. The CER may then deny the session initiation from the protected server and send an alarm, e.g., a system log.

In one embodiment, the method detects a Denial of Service (DoS) attack by monitoring the number of half open sessions from one or more customer endpoint devices to a specific server within a PSG. For example, if the number of half-open sessions from a set of customer endpoint devices to a specific server reaches or exceeds a predetermined threshold, the method may detect a DoS attack and initiate a remedy step. For example, the method may delete old sessions when new sessions are requested to keep the total number of sessions less than or equal to the above predetermined threshold.

Figure 3:
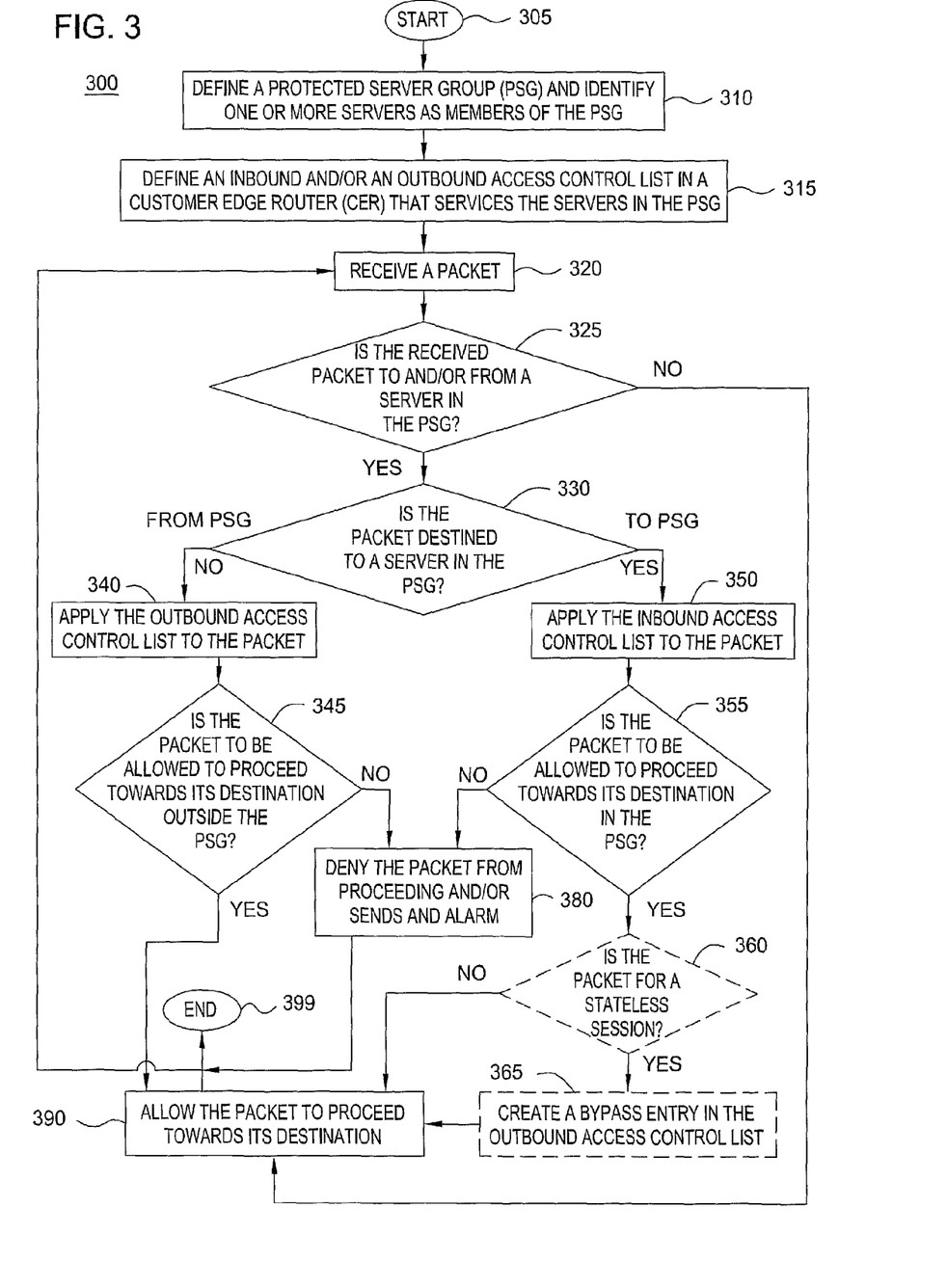
FIG. 3 illustrates a flowchart of a method for providing security in an intranet network.

FIG. 3 illustrates a flowchart of a method 300 for providing security in an intranet network. For example, one or more steps of method 300 can be implemented in a CER. Method 300 starts in step 305 and proceeds to step 310.

In step 310, method 300 defines a Protected Server Group (PSG) and identifies one or more servers as members of the PSG, wherein each server in the PSG is to be provided intranet security. For example, the method determines (e.g., via user or network administrator input) one or more servers that need intranet security and defines a PSG that contains the servers that need the intranet security.

In step 315, method 300 defines an inbound access control list and/or an outbound access control list in a Customer Edge Router (CER) that services the servers in the PSG. For example, the inbound access control list may be populated with IP addresses that may not access the protected server group. Similarly, the outbound access control list may be populated with traffic from the PSG that should be blocked from reaching other networks. For example, a server within the PSG may be allowed to initiate a session only to a specific list of addresses. If a session to another IP address is then initiated, it may be an indication that the server is compromised.

In step 320, method 300 receives a packet. For example, the method receives a packet with a destination address in the protected server group. In another example, the method receives a packet with an origination address in the protected server group.

In step 325, method 300 determines whether or not the received packet is to and/or from a protected server group. For example, the packet may be from outside a protected server group and may also be destined to a device outside the protected server group. In another example, the packet may have originated outside the protected server group but may be destined to a server in the protected server group. If the packet is to and/or from a protected server group, the method proceeds to step 330. Otherwise, the method proceeds to step 390.

In step 330, method 300 determines if the packet is destined to a server in the PSG. If the packet is destined to a server in the PSG, the method proceeds to step 350. Otherwise, the method proceeds to step 340. For example, if the packet is from an address in the PSG, the method proceeds to step 340.

In step 340, method 300 applies the outbound access control list to the packet. For example, the method determines if the outbound access control list has an entry that defines whether the packet should be blocked from proceeding towards its intended destination. The method then proceeds to step 345.

In step 345, method 300 determines whether the packet is to be allowed to proceed towards its destination. If the packet is allowed to proceed towards its destination, the method proceeds to step 390. Otherwise, the method proceeds to step 380.

In step 350, method 300 applies the inbound access control list to the packet. For example, the method determines if the inbound access control list has an entry that defines whether the packet should be blocked from proceeding towards its destination in the PSG. The method then proceeds to step 355.

In step 355, method 300 determines whether the packet is to be allowed to proceed towards its destination. If the packet is allowed to proceed towards its destination, the method proceeds to optional step 360. Otherwise, the method proceeds to step 380.

In optional step 360, method 300 determines if the packet is for a stateless session. For example, the packet may be for a User Datagram Protocol (UDP) or Internet Control Message Protocol (ICMP) session. If the packet is for a stateless session, the method proceeds to optional step 365. Otherwise, the method proceeds to step 390.

In optional step 365, method 300 creates a bypass entry in the outbound access control list to permit return traffic for the session wherein the bypass entry is valid for a predetermined period of time. For example, if the session is UDP session, the method may create a bypass entry to allow a response to proceed unhindered for a predetermined period of time. The method then proceeds to step 390.

In step 380, method 300 denies the packet from proceeding and/or sends an alarm. For example, the method may deny a session request and then send an alarm to a monitoring device. The network monitoring device may use the information to determine if a server is compromised. For example, the session request may be unauthorized. The method then proceeds to step 399 to end processing the current packet, or the method may return to step 320 to continue receiving packets.

In step 390, method 300 allows the packet to proceed towards its destination. For example, if the packet is not to or from PSG, the method allows the packet to proceed without applying the access control lists. If the packet is from the PSG towards a destination outside of the PSG, the method allows the packet to proceed to the destination outside of the PSG. If the packet is from an address outside the PSG but is destined to an address in the PSG, the method allows the packet to proceed towards the address in the PSG. The method then proceeds to step 399 to end processing the current packet, or the method may return to step 320 to continue receiving packets.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
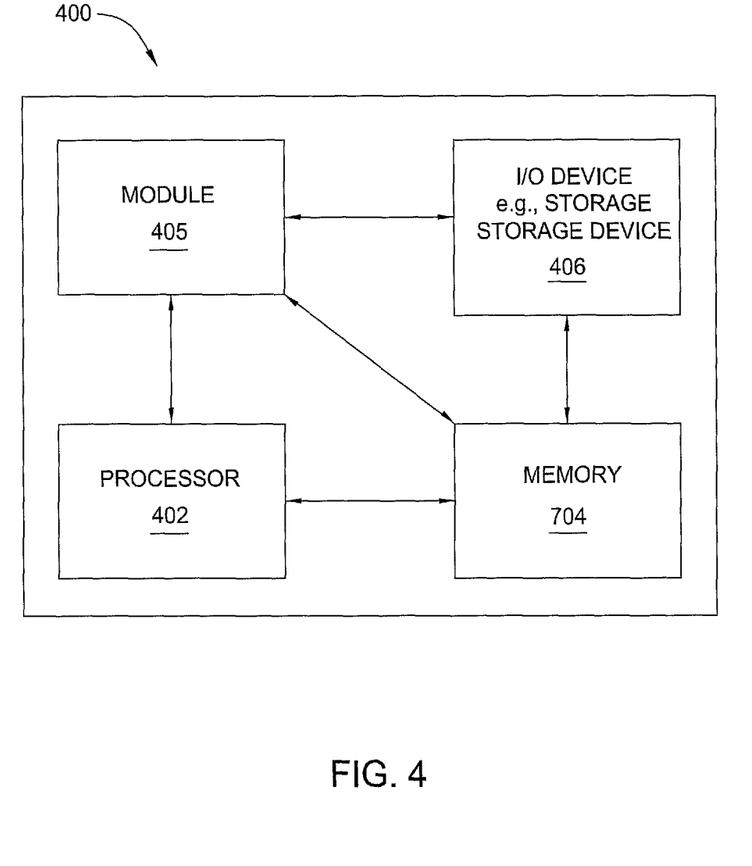
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing security in an intranet network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing security in an intranet network can be loaded into memory 404 and executed by processor 402 to implement the functions as discussed above. As such, the present method 405 for providing security in an intranet network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing security in a virtual private network, the method comprising:

defining, by a processor of a customer edge router, a protected server group, wherein the protected server group identifies a subset of all customer endpoint devices in the virtual private network, wherein the subset includes a server within the virtual private network to be protected;

receiving, by the processor, a packet; and applying, by the processor, an outbound access control list to the packet when the packet is from a server in the protected server group, wherein the outbound access control list comprises an outbound list of internet protocol addresses that the protected server group is allowed to initiate a session with, wherein the applying the outbound access control list comprises:

determining that the packet is from the server in the protected server group and that the packet is sent without being solicited; and blocking a transmission of the packet that is sent without being solicited.

2. The method of claim 1, further comprising:

allowing the packet to proceed towards its destination when the packet is not to or from the server in the protected server group.

3. The method of claim 1, further comprising:

determining whether the server in the protected server group has been compromised by monitoring a request from the server for creating a session.

4. The method of claim 1, further comprising:

detecting a denial of service attack by monitoring a number of half open sessions from a customer endpoint device to the server in the protected server group.

5. The method of claim 1, wherein the packet is for a stateless session.

6. The method of claim 1, wherein the packet is for a user datagram protocol session.

7. The method of claim 1, wherein the packet is for an internet control message protocol session.

8. A tangible non-transitory computer-readable medium storing a plurality of instructions which, when executed by a processor of a customer edge router, cause the processor to perform operations for providing security in a virtual private network, the operations comprising:

defining a protected server group, wherein the protected server group identifies a subset of all customer endpoint devices in the virtual private network, wherein the subset includes a server within the virtual private network to be protected;

receiving a packet; and applying an outbound access control list to the packet when the packet is from a server in the protected server group, wherein the outbound access control list comprises an outbound list of Internet protocol addresses that the protected server group is allowed to initiate a session with, wherein the applying the outbound access control list comprises:

determining that the packet is from the server in the protected server group and that the packet is sent without being solicited; and blocking a transmission of the packet that is sent without being solicited.

9. The non-transitory computer-readable medium of claim 8, further comprising:
  allowing the packet to proceed towards its destination when the packet is not to or from the server in the protected server group.

10. The non-transitory computer-readable medium of claim 8, further comprising:
  determining whether the server in the protected server group has been compromised by monitoring a request from the server for creating a session.

11. The non-transitory computer-readable medium of claim 8, further comprising:
  detecting a denial of service attack by monitoring a number of half open sessions from a customer endpoint device to the server in the protected server group.

12. The non-transitory computer-readable medium of claim 8, wherein the packet is for a stateless session.

13. The non-transitory computer-readable medium of claim 8, wherein the packet is for a user datagram protocol session.

14. The non-transitory computer-readable medium of claim 8, wherein the packet is for an internet control message protocol session.

15. An apparatus for providing security in a virtual private network, the apparatus comprising:
  a processor of a customer edge router; and
  a non-transitory computer-readable medium storing a plurality of instructions which, when executed by the processor, cause the processor to perform operations, the operations comprising:
    defining a protected server group, wherein the protected server group identifies a subset of all customer endpoint devices in the virtual private network, wherein the subset includes a server within the virtual private network to be protected;
    receiving a packet; and
    applying an outbound access control list to the packet when the packet is from a server in the protected server group, wherein the outbound access control list comprises an outbound list of internet protocol addresses that the protected server group is allowed to initiate a session with, wherein the applying the outbound access control list comprises:
      determining that the packet is from the server in the protected server group and that the packet is sent without being solicited; and
      blocking a transmission of the packet that is sent without being solicited.

16. The apparatus of claim 15, wherein the operations further comprise:
  allowing the packet to proceed towards its destination when the packet is not to or from the server in the protected server group.

17. The apparatus of claim 15, wherein the operations further comprise:
  determining whether the server in the protected server group has been compromised by monitoring a request from the server for creating a session.

18. The apparatus of claim 15, wherein the operations further comprise:
  detecting a denial of service attack by monitoring a number of half open sessions from a customer endpoint device to the server in the protected server group.

19. The apparatus of claim 15, wherein the packet is for a stateless session.

20. The apparatus of claim 15, wherein the packet is for a user datagram protocol session or an internet control message protocol session.

* * * * *